June 16, 1931.  J. SLEPIAN  1,810,033
ELECTRIC APPARATUS
Original Filed Jan. 2, 1924  3 Sheets-Sheet 1

WITNESSES:
Carl J. Loench
S. M. Pineles

INVENTOR
Joseph Slepian
BY
Wesley F. Carr
ATTORNEY

June 16, 1931. J. SLEPIAN 1,810,033
ELECTRIC APPARATUS
Original Filed Jan. 2, 1924   3 Sheets-Sheet 2
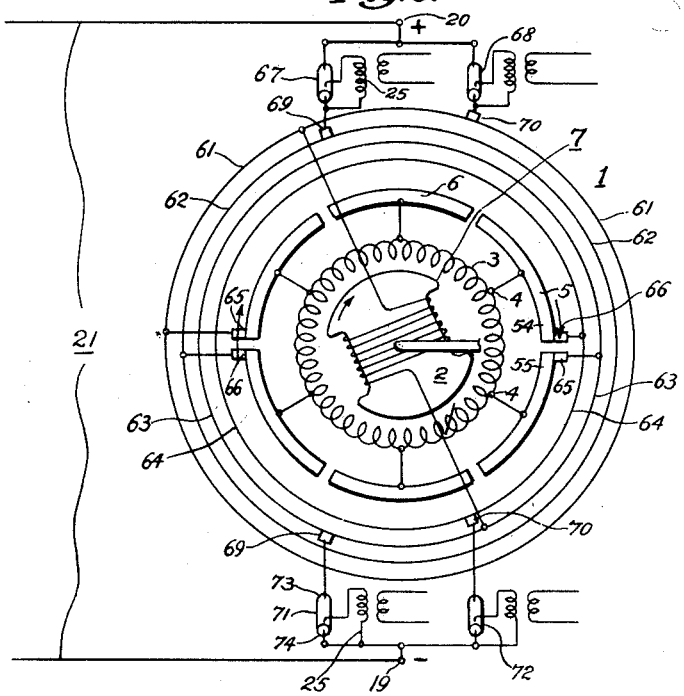
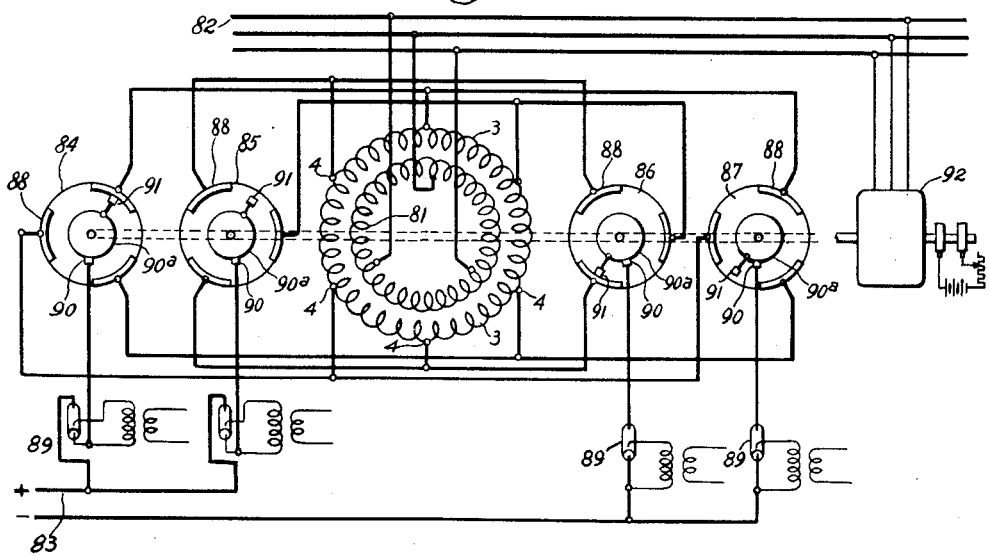
WITNESSES:
INVENTOR
Joseph Slepian
BY
ATTORNEY June 16, 1931.   J. SLEPIAN   1,810,033
ELECTRIC APPARATUS
Original Filed Jan. 2, 1924   3 Sheets-Sheet 3

WITNESSES:
*Carl J. Loesch*
*S. M. Pineles*

INVENTOR
*Joseph Slepian*
BY
*Wesley G. Carr*
ATTORNEY

Patented June 16, 1931

1,810,033

UNITED STATES PATENT OFFICE

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA

ELECTRIC APPARATUS

Application filed January 2, 1924, Serial No. 684,061. Renewed April 12, 1930.

My invention relates to electric apparatus and it has particular reference to means for the improvement of the commutation of such apparatus.

One object of my invention, in its broad aspects, is to provide improved means for commutating currents flowing in windings of electrical apparatus.

A more specific object of my invention is to improve the commutation of electric machines by the provision of unidirectionally conducting means connected in series with the commutating circuit.

Another object of my invention is to provide dynamo-electric machines of the commutator type employing a unidirectionally conducting space current valve connected in series with the commutator bars leading to the commutating portion of the winding.

Another object of my invention is to provide a novel combination of unidirectionally conducting devices and switching or commutating devices for converting alternating current from one frequency to another, converting alternating current to direct current and vice versa.

A further object of my invention is to provide unidirectionally conducting means connected in series with the commutating bars of commutators of electric machines, in combination with means for stopping the flow of current through the bars before their disengagement from the cooperating current-collecting brush members.

A still further object of my invention is to provide commutators for electric apparatus employing mercury arc valves connected in series with the commutator bars.

There is a definite physical limitation for the maximum voltage permissible for the commutator bars of electric machines. For successful operation of such machines, it is essential that the current-collecting brush shall leave the commutator bar at a moment when the current through the brush is zero, thereby insuring sparkless operation. To this end, the commutating coil is usually brought into a magnetic field, which induces a corrective electromotive force which helps to reverse the current through the coil, and which is intended to create the condition of zero current at the moment when the brush leaves the engagement with the commutator bar.

Under ideal conditions, the corrective electromotive force induced in the commutating coil by the above mentioned reversing field should be equal and opposite to the electromotive force tending to circulate the current in the original direction. It is obviously difficult to obtain a corrective electromotive force which would exactly neutralize the electromotive force tending to maintain the current in its original direction of flow; and as shown in B. G. Lamme's Electric Engineering Papers, page 251, it is only because of the relatively high resistance of the contacting surface of the brush employed with commutators of such machines that satisfactory operation over the normal working range of such machines may be obtained. Under the conditions just mentioned, the maximum allowable voltage for the commutator bar was found to be about 20 or 30 volts.

I have found that by the provision of unidirectionally conducting means or rectifiers connected in series with the bars leading to the commutating coils of the winding, the above-mentioned limitations may be avoided. First of all, such an arrangement permits the flow of the current only from the winding to the current-collecting terminal, and a closed circuit between adjacent commutator bars is prevented by reason of the fact that the serially connected rectifiers leading to the terminals of the commutating coil oppose each other in the local circuit created by a brush spanning two segments. The one or the other of the rectifiers will, therefore, oppose the circulation of a short-circuit current. Furthermore, in my invention, the corrective voltage which may be induced in the commutating coil is not limited to any definite value and, for the purposes of my invention, usually exceeds the voltage that would ordinarily be necessary to balance the electromotive force opposing the reversal of the current.

In the ordinary construction, an excess of corrective electromotive force would cause a reversal of the current flowing through the bar which is about to leave the contact with the brush, thus causing sparking, since such reversed current flow is just as objectionable as a current-flow caused by too small a corrective electromotive force. By my invention, the unidirectional character of the connections leading to the trailing side of the commutating portion of the winding definitely prevents a reversal of the current and insures absolutely sparkless operation of the commutator. The latter feature is chiefly responsible for the higher voltages which are permissible per bar in commutators arranged according to my invention, such voltages being dependent only upon the particular characteristics of the rectifying means which are utilized.

In carrying out my invention, I have found that mercury arc rectifiers, and particularly rectifiers having two mercury electrodes, are admirably adapted for use with commutating devices. Such rectifiers combine a very high current-carrying capacity, good efficiency and a good mechanical construction with operating characteristics which are of particular advantage in connection with my invention. Furthermore, rectifiers having both the cathode and the anode of mercury have the property of conducting in a single direction during their operation, the direction of current flow depending solely upon which electrode was initially made the cathode, and the conductive quality ceasing almost instantly upon a reduction of the current to zero.

With the foregoing and other objects in view, my invention consists in the combinations, arrangements and details of construction hereinafter described and claimed and illustrated in the accompanying drawings, wherein Figure 1 is a diagrammatic view of a dynamo-electric machine embodying my invention;

Fig. 3 is a diagrammatic view of a dynamo-electric machine embodying a modified form of my invention;

Fig. 4 is an diagrammatic view of a rotary converter embodying another form of my invention;

Figure 1:
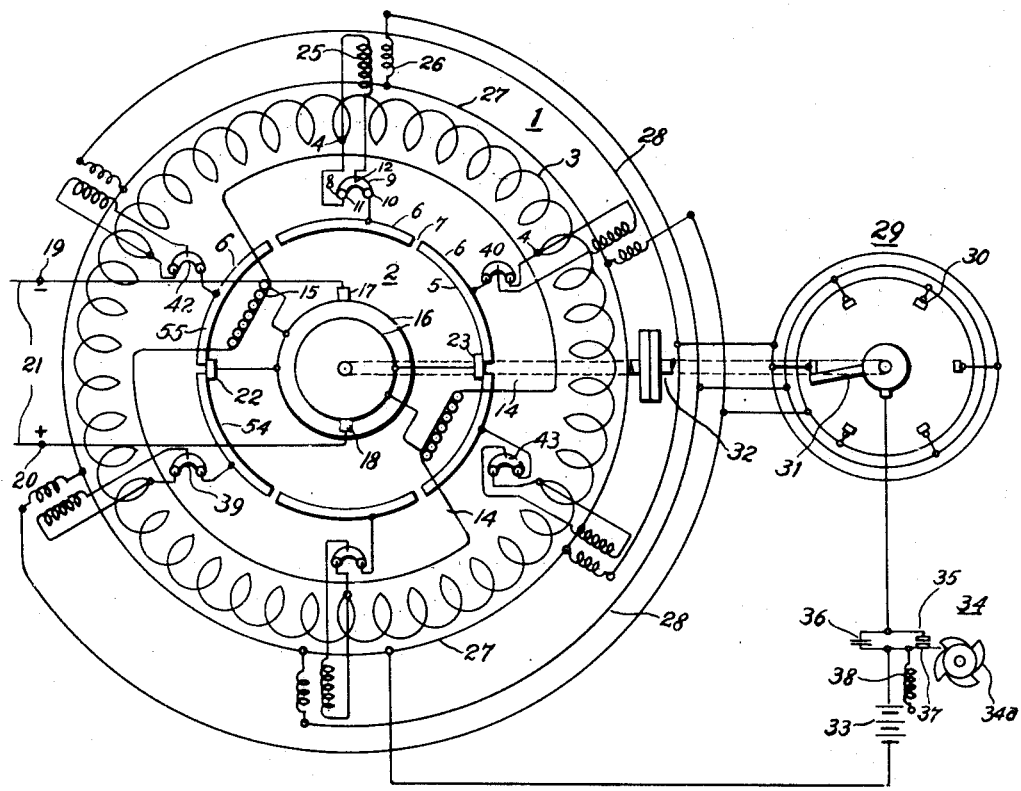

In Fig. 1 is shown a direct-current motor or generator comprising a stator 1 and a rotor 2 cooperating therewith. The stator comprises a closed winding 3 which is provided with a plurality of uniformly spaced taps 4 and a commutator cylinder 5 which is provided with a plurality of commutator segments 6 which are separated by insulating members 7. The individual commutator bars or segments 6 are connected to corresponding taps 4 of the stator winding 3 by means of mercury arc valves 8.

Each of the mercury arc valves comprises an evacuated vessel or envelope 9 having two mercury pools 10 and 11 acting as current-carrying electrodes connected respectively to the commutator segments 6 and to the winding taps 4. Each mercury arc valve is further provided with an auxiliary starting electrode 12 for causing the one or the other of the mercury electrodes to become a cathode as explained hereinafter.

The rotor member 2 is shown diagrammatically as comprising an armature having two salient poles 14 which are excited by means of an exciting winding 15 mounted thereupon. The rotor is further provided with two slip rings 16 cooperating with two brushes 17 and 18 leading respectively to a negative terminal 19 and a positive terminal 20 of a direct-current supply line 21.

The slip rings 16 supply current to the exciting winding 15 of the rotor member 2 and are also connected, respectively, to two brushes 22 and 23, rotating with the rotor member and bearing upon the commutator cylinder 5 of the stator winding 3. The brushes 22 and 23 are shifted from the neutral zone of the armature in order to bring the commutating coils of the winding into a magnetic field which is favorable to the commutation.

Before explaining the functions of the mercury valves 8 connecting the commutator segments 6 to the taps of the winding 3, I wish to point out that, assuming the mercury valves as conducting connections, the machine would operate as a direct-current motor with the aforesaid limitations regarding the maximum permissible voltage.

The provision of the mercury arc valves, however, makes the connections between the commutating segments 6 and the taps of the winding 3 normally non-conductive and special means are required for actuating the mercury valves in accordance with the rotation of the armature as hereinafter more fully explained.

Each mercury arc valve is provided with an ignition coil 25 having one terminal connected to the corresponding tap upon the winding 3 and having the other terminal connected to the auxiliary starting electrode 12 of the valve. The ignition coils 25 are energized by means of primary windings 26 that are inductively coupled to the ignition coils and are energized by means of a common return conductor 27 and several conductors 28 leading from diametrically opposed pairs of the valves 8 to a distributor 29 of pulsating direct current. The distributor 29 comprises a plurality of annularly disposed distributing contact members 30 which are connected in diametrically opposed pairs, to the several conductors 28 leading to the primary windings of the ignition coils and a distributing arm 31 which is rotated by means of a shaft 32 coupled to the rotor 2 of the motor.

The pulsating direct-current is derived from a direct-current source 33 which is connected, in series with an interrupter 34, between the common return conductor 27 of the ignition coils and the rotating distributing arm 31.

The interrupter 34 consists of a pair of quick-break contacts 35 of a familiar type, shunted by a condenser 36. One of the contacts 35 is mounted upon a flexible arm 37 which is held in open position by the spring 38. The flexible arm 37 is actuated by means of a toothed cam 34a, rotated at a high speed for closing and opening the quick-break contact 35. The relative widths of the distributor contacts 30 and the contact arm 31, as well as the relative adjustments of the positions of the rotor 2 and the distributor arm 31, are such that the ignition coils 25 are actuated a short instant after the leading sides of the commutator brushes 22 and 23, respectively, come into contact with the leading commutator segment. In the preferred arrangement shown in the drawings, the ignition coils are deenergized before the trailing side of the brush 22 or 23 breaks its contact with the trailing commutator segment.

The making and breaking of the quick-break contacts 35 sends a pulsating direct current through the primary windings 26 of the ignition coils 25 during the short interval of their engagement with the interrupter 34, the pulsating direct current inducing, in turn, a high direct-current potential between the terminals of the ignition coils 25, the high direct-current potential resulting from the quick interruption and the relatively slow establishment and building up of the current in the circuit including the interrupter 34.

The high direct-current potential of the auxiliary electrode 12 will cause a discharge between said electrode and either the one or the other of the mercury electrodes, depending upon which of the mercury electrodes has the lower potential, and this will depend, in turn, upon the polarity of the respective brushes 22 and 23 cooperating with the corresponding commutator segments.

Figure 2:
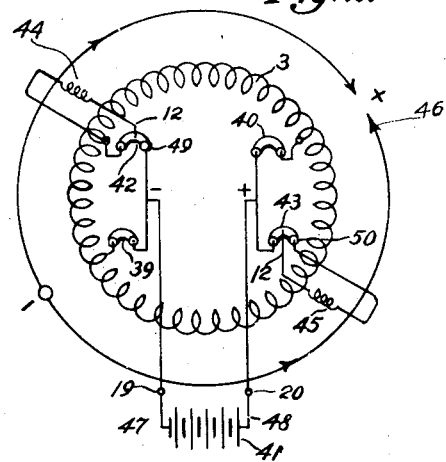
Fig. 2 is an explanatory diagram illustrating the operation of the ignition device employed in Fig. 1.

This will be best understood by considering Figure 2 illustrating the conditions in the stator winding 3 at a moment when the ignition occurs. The essential elements of the circuit are illustrated and comprise the stator winding 3, two diametrically disposed mercury valves 39 and 40 constituting the conducting connections of a diagrammatically illustrated source of direct current 41, and two other mercury arc valves 42 and 43 which are about to be actuated by means of the ignition coils 44 and 45, respectively. The voltage distribution of the stator winding 3 at the moment of ignition is indicated by means of two arrows 46 leading from the point of the winding which is connected, through the mercury valve 39, to the negative terminal 47 of the direct-current source 41, to the point of the winding which is connected, through the mercury valve 40, to the positive terminal 48 of the direct-current source 41.

The auxiliary electrode 12 of the mercury valve 42 will discharge towards the mercury pool 49 leading to the negative terminal 47 of the direct-current source 41 by reason of the fact that the potential of the above terminal is lower than the potential of the mercury electrode leading to the winding tap. The igniting current will then pass through the source 41 and then through valve 40, if that is conducting, to the winding 3. The igniting current flows, through the winding 3, back to the tap that leads to the outside end of the coil 44. From this tap, the current retraces the path through coil 44 and the auxiliary electrode. If the valve 43 is in operation before the ignition current from valve 42 reaches the brush 23, the current will probably pass through that valve instead of through the valve 40. Since the current sent out during the first instant of time by ignition coil 44 is a high-frequency pulse, the electrostatic capacities, such as those existing between winding 3 and elements conductively connected to the direct-current line, will act to short-circuit, for such a pulse, parts of the current path just described; and, as soon as the arc from the other mercury electrode to mercury pool 49 becomes substantial, such arc will, in effect, become a conductor and short circuit the ignition coil 44. On the other hand, the auxiliary electrode 12 of the mercury arc bulb 43 which is connected to the positive terminal of the direct-current source will discharge toward the mercury pool 50 leading to a tap of the stator winding because of the lower potential of such tap. The current will then pass through the ignition coil 45 and back again to the auxiliary electrode 12. One-half a revolution of the brushes 22 and 23 will cause the discharge from the auxiliary electrode 12 of the valve 42 to the electrode opposite mercury pool 49, and the current will then pass, through the coil 44, back to the electrode 12. The discharge in the valve 43 will, at about the same time, be from the auxiliary electrode 12 to the electrode opposite mercury pool 50 and from thence the ignition current will pass, through current source 41 and either valve 39 or valve 42, to the winding 3. This current will pass around the winding 3 and from the tap, to and through the coil 45, and back to the auxiliary electrode 12. The above arrangement will accordingly excite the electrodes of the proper polarity and will cause the mercury arc valves to become conducting in the proper direction, as they come in contact with the leading commutator bars.

The operation of the commutator is as follows: After the advancing brush comes in contact with a new or leading commutator segment, the ignition coil is actuated for a short interval and thereby renders the corresponding rectifier bulb conductive. The leading commutator segment thereupon starts to carry current. The position of the brushes with respect to the pole members 14 of the armature is such that the commutating coil, i. e., the coil which is connected between the two commutator segments which are spanned by a brush, rotates in a magnetic field tending to reverse the current therethrough.

Figure 6:
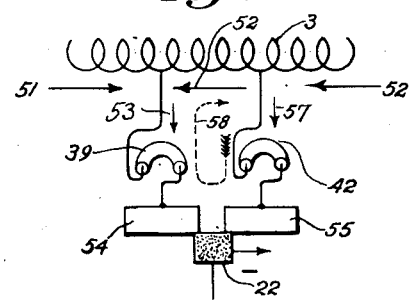
Fig. 6 is a diagrammatic detail view illustrating the commutation of the commutating device employed in Fig. 1.

The conditions prevailing in a commutating coil at the instant of commutation are represented in detail in Fig. 6, illustrating the operation of a portion of the winding co-operating with the negative brush of the machine of Figs. 1 and 2. The current was originally flowing from both sides of the winding 3 in the directions indicated by the arrows 51, 52, 53, through the mercury valve 39 and the trailing commutator segment 54, to the negative brush 22. After the brush becomes engaged with the leading commutator segment 55 and the mercury valve 42 becomes conducting in the direction indicated by the arrow 57, the magnetic field induces, in the commutating coil, a corrective electromotive force indicated by the arrow 58. The induced corrective electromotive force tends to reverse the current flowing through the trailing mercury valve 39, but all it can do is to reduce the current to zero.

It has been pointed out that, in the usual construction, the corrective electromotive force induced in the commutating coil has to be, within very close limits, equal and opposite to the electromotive force tending to circulate the current in the original direction. With my improved arrangement, I employ a reversing field which induces an electromotive force which is considerably larger than the electromotive force tending to maintain the flow of current in the original direction, without any danger that the current through the segment leading to the trailing tap of the commutating coil will become actually reversed and cause sparking of the brush.

The particular advantages of using mercury arc valves or rectifiers in connection with my invention result from the well-known fact that mercury arc valves are adapted to carry relatively large currents at a low arc voltage. The tubes or valves, however, become non-conductive as soon as the current decreases to zero, by reason of the fact that the mercury vapor constituting the chief conducting medium in the tube is very rapidly condensed. As a further advantage, the employment of valves having two mercury electrodes permits the use of the mercury valves for conduction in both directions while maintaining the unidirectional properties of the mercury arc. Such a valve, when started, conducts in one direction only. Upon a decrease of the current to zero, the valve acts as an open circuit and hence an electromotive force tending to send a current in the opposite direction cannot reverse the current, since it cannot cause the mercury pool which was formerly an anode to become a cathode.

A machine constructed according to the above descriptions will operate either as a motor or as a generator, and by the employment of proper reversing fields, the maximum voltage admissable per commutator segment may be many times the normally permissible voltage, depending only upon the operating characteristics of the rectifying tubes and upon the strength of the reversing magnetic field. It is, of course, understood that the reversing field may be obtained by other means than by shifting the brushes from the neutral zone, for instance, it may be obtained by the employment of the familiar interpole construction.

In Fig. 3 is shown a modification of my invention which avoids the use of a separate rectifier for each commutator segment. A dynamo-electric machine 1 comprises a stator winding 3, a rotor member 2 and a commutator 5, as in Fig. 1. The rotor member 2 is provided with a pair of positive slip rings 61 and 62 and a pair of negative slip rings 63 and 64. The two slip rings of each pair are electrically connected, respectively, to two brushes 65 and 66 which are insulated from each other. The brushes 65 and 66 rotate with the rotor 2 and bear upon the commutator segment 6. The relative widths of the brushes 65 and 66, the commutator segments 6 and the insulating segments 7 are such that none of the brushes in particular the trailing brushes, ever bridges two commutator segments and that the trailing brush leaves engagement with the trailing commutator segment after the leading brush is in engagement with the leading commutator segment.

A direct-current supply line 21 is provided with a negative terminal 19 and a positive terminal 20. The positive terminal 20 is connected, through two unidirectionally conducting mercury valves 67 and 68, to two brushes 69 and 70 bearing upon the two positive slip rings 62 and 61. The negative terminal 19 is similarly connected, through two rectifiers 71 and 72, to two brushes bearing upon the two negative slip rings 63 and 64. The rectifiers may be of the familiar type and comprise an envelope having an anode 73 and a mercury cathode 74. The cathodes are actuated by means of ignition coils 25 during the entire operation of the machine. The brushes 65 and 66 are displaced from the neutral zone of the rotor 2 in order to bring the commutating coil into a reversing field of proper strength.

Figure 7:
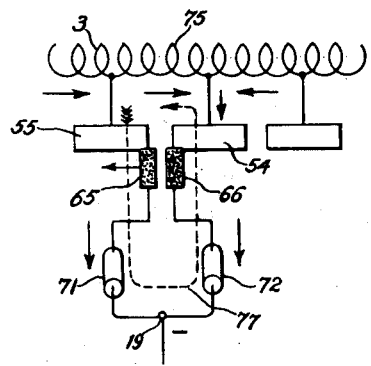
Fig. 7 is a similar view illustrating the commutation of the commutating device employed in Fig. 3.

In operation, the commutation of the currents will take place in a way similar to that shown in the machine in Fig. 1. The conditions during the commutation period are illustrated diagrammatically in Fig. 7 showing a commutating coil 75 of the winding 3 connected to two commutator segments 55 and 54 which are in engagement with the two brushes 65 and 66 leading, through the rectifiers 71 and 72, respectively, to the negative terminal 19 of the direct-current supply line. The leading brush 65 leaves the trailing commutator bar 54 entirely sparkless by reason of the fact that there is no electromotive force present to prevent the transfer of all of the current from the leading brush 65 to the trailing brush 66. After the leading brush 65 has engaged the leading commutator segment 55, the reversing field induces, in the coil 75 undergoing commutation, an electromotive force, indicated by the arrow 77, which transfers the current to the leading brush 65 and to the leading commutator bar 55 while trying to reverse the current through the trailing brush 66. An actual reversal of the current is, however, prevented by reason of the unidirectional character of the rectifier 68 opposing the reversal of the current.

In Fig. 4 is shown a machine for converting alternating current into direct current or vice versa. The essential parts of the machine are the same as those in Figs. 1 and 3 except that the rotary magnetic field is produced by a polyphase winding 81 which is fed from a polyphase supply line 82. A winding 3 is in inductive relation to the polyphase winding 81 and is provided with a plurality of uniformly spaced taps 4 leading to commutator members cooperating with brushes connected to a direct-current supply line 83.

There are two commutator members 84, 85 and 86, 87, respectively, for each pole of the direct-current supply line. Each commutator member comprises half as many segments 88 as there are taps 4 upon the winding 3. The successive taps 4 of the winding 3 are connected alternately to successive segments 88 upon the two commutators 84, 85 of one polarity, respectively, and also to the two commutators 87, 86 of the other polarity, respectively.

Each terminal of the direct-current supply line is connected, through two rectifiers 89, auxiliary brushes 90 and slip rings 90a, to two revolving brushes 91 bearing on the two commutators of the corresponding polarity. The brushes 91 are rotated at synchronous speed by means of a shaft driven by a synchronous motor 92 which is supplied from the polyphase supply line 82. The two brushes corresponding to one pole of the direct-current supply are so disposed relatively to each other that, during rotation, each of the brushes acts alternately as a leading and as a trailing brush with respect to the taps of the winding 3. The relative width of the commutator segments is so chosen that the brush which is connected to the segment leading to the trailing tap of the winding 3 does not leave its engagement with the segment before the leading brush engages the segment connected to the leading winding tap.

In the operating of the device shown in Fig. 4, the brushes are shifted from the neutral zone of the rotating field in order that the commutating coil shall operate in a reversing field as explained herein above. The commutating coils are connected, through the brushes 90 and 91 and the rectifiers 89, to the supply-line terminals. The corrective electromotive force induced by the reversing magnetic field transfers the current from the trailing commutator segment to the leading segment and tends to reverse the current through the latter. All that it can do, however, is to reduce the current to zero. The proportion of brush-width to commutator-bar width is so chosen that the current is fully transferred to the leading brush before the disengagement of the trailing brush from the corresponding commutator segment.

Figure 5:
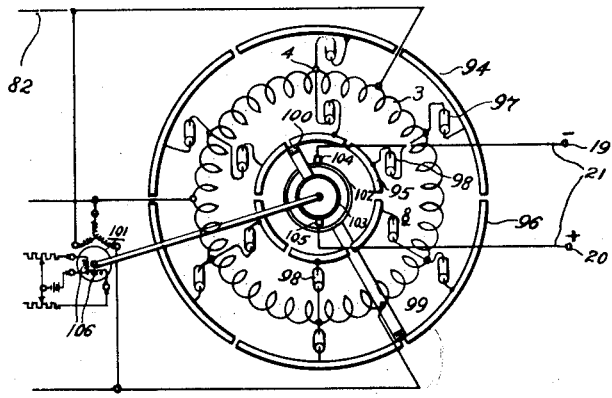
Fig. 5 is a diagrammatic view of a rotary converter embodying my invention in a modified construction.

In Fig. 5 is shown another modification of my invention. An alternating-current converter comprises a stator having a closed polyphase winding 3 which may be connected directly to a polyphase system 82. The winding is provided with a plurality of equally spaced taps 4. The stator is further provided with a "negative" commutator cylinder 94 and a "positive" commutator cylinder 95, each commutator cylinder comprising as many conducting segments 96 as there are taps 4 on the winding 3. The individual segments of the "negative" commutator cylinder 94 are connected to corresponding taps 4 on the winding 3 by means of a set of rectifiers 97 adapted to permit a flow of current in the direction from the taps of the winding to the segments of the commutator. The individual segments of the "positive" commutator cylinder 95 are connected to corresponding taps 4 on the winding 3 by means of another set of rectifiers 98 adapted to permit the flow of current in the direction from the segments of the commutator to the taps of the winding 3. The brushes 99 and 100 are rotated synchronously with the polyphase system as my means of a motor 101, and are connected, by means of slip-rings 102 and 103 and brushes 104 and 105, to the terminals 19 and 20, respectively, of a direct-current line 21.

The operation of the stator shown in Fig. 5 is analogous to that of the machine illustrated in Fig. 1, except that instead of one commutator with mercury valves adapted to conduct alternately in both directions, two separate commutators are provided with rectifiers operating in one direction only. The latter arrangement obviates the necessity for the employment of a separate ignition timing device.

The brushes 99 and 100 cooperating with the two commutator cylinders 94 and 95 of the stator, are so shifted from the neutral zone of the rotary field, which is determined by the phase of the polyphase currents drawn from the polyphase system, that the commutating coils of the stator winding 3 have induced therein a reversing voltage, in the same manner as described before, causing the current to be diverted to the advancing commutator segment before the trailing segment leaves the contact with the brush.

The shifting of the brushes 99 and 100 may be accomplished by a suitable arrangement of the afore-mentioned synchronous motor, as by means of a two-phase exciting winding 106 for controlling the position of the center line of the resultant field, or by any other well-known arrangement.

The apparatus shown in Fig. 5 may be used either for transforming alternating current into direct current, or direct current into alternating current. The stator arrangement of Fig. 5 may also be substituted for any of the stators shown in Figs. 1, 3 and 4.

In the above-described arrangements, I have shown how rectifier means, or in general, means having unidirectional conducting properties may be successfully utilized to commutate currents in windings wherein the direction of current-flow varies in a substantially periodical manner. I have shown that such commutation may take place independently of the limitations imposed upon ordinary commutating arrangements. I have further shown how the mercury arc valves are, by reason of their high conductivity and peculiar operating characteristics, especially adapted for use in such commutating circuits.

I have further shown apparatus illustrating how the novel principles herein set forth may be practically applied. Various modifications thereof and other applications of these principles will suggest themselves to those skilled in the art and it is my desire that the appended claims shall be accorded the broadest construction consistent with the prior art.

I claim as my invention:

1. The combination of a dynamo-electric commutation circuit of which a portion is desired to carry current at times in one direction only and at other times in the other direction only, of a mercury-arc device having two mercury electrodes which are connected in series with said circuit.

2. In a dynamo-electric commutation circuit including a conductive portion, means for rendering said circuit unilaterally conductive alternately in opposite directions, a mercury-arc device having two mercury electrodes connected in series with said circuit and means for selectively and automatically causing the one or the other of said mercury electrodes to act as a cathode of an arc discharge in accordance with predetermined voltage conditions.

3. In an electric apparatus, the combination of a winding, commutator mechanism connected to said winding, brushes bearing thereon, and polarizing means for imparting to the connections of said winding to said commutator mechanism unilateral conductivity in either one of the two opposite directions, respectively, according to the direction of the desired current-flow to or from the respective brushes at any instant.

4. In an electric apparatus, the combination of a winding having a plurality of taps, commutator mechanism comprising a plurality of commutator bars, positive and negative brushes bearing thereon, and unidirectionally conducting means connected between said winding taps and said commutator bars in such manner that the current flowing to or from said positive and negative brushes, respectively, cannot be reversed in the winding coils undergoing commutation.

5. In an electric apparatus, the combination of a winding, commutator mechanism provided with a plurality of commutator bars, direct-current brushes for cooperation with said commutator mechanism and adapted to rotate relatively thereto, means tending to reverse the current flowing through the trailing bars which are about to leave their engagement with said brushes, and rectifier means connecting said commutator bars to said winding in such manner that a reversed current-flow is substantially prevented in said trailing bars.

6. In an electric apparatus, the combination of means for producing a rotary magnetic field, a winding mounted to be subject to induction by said rotary field, a plurality of terminals upon said winding, commutator mechanism comprising a plurality of commutator bars, a positive current-collecting brush and a negative current-collecting brush cooperating with said commutator mechanism, said brushes and commutator mechanism being adapted to rotate relatively to each other, and means for inducing, in the commutating portions of said winding, an electromotive force tending to reverse the current flowing through the trailing commutator bars before their disengagement from the brushes cooperating therewith, and rectifier means connecting said commutator bars to said winding in such manner that a reversed current-flow is substantially prevented in said trailing bars.

7. In a dynamo electric machine, the combination of means for producing a rotary magnetic field, a winding mounted to be subject to induction by said rotary field, a plurality of terminals upon said winding, commutator mechanism comprising a plurality of commutator bars, positive and negative current-collecting brushes cooperating with said commutator mechanism, said brushes and commutator mechanism being adapted to rotate relatively to each other in accordance with the rotation of said field, and rectifier means for connecting said winding terminals to the bars of said commutator mechanism in the directions corresponding to the polarities of the adjacent brushes, respectively, said brushes being so displaced from the neutral axis of said winding that said rotary field induces, in the commutating winding portions, electromotive forces in the direction of the currents flowing in said winding portions after the commutation is effected.

8. In an electric apparatus, the combination of means for producing a rotary magnetic field, a winding mounted to be subject to induction by said rotary field, a commutator member provided with a plurality of bars, a plurality of mercury arc valves connecting said bars to said winding, each of said valves comprising an envelope, two mercury electrodes, and means for causing either one or the other of said electrodes to become a cathode.

9. In an electric machine, the combination of means for producing a rotary magnetic field, a winding mounted to be subject to induction by said field, and connecting means for said winding including a plurality of mercury arc valves, each of said valves comprising an envelope, two mercury electrodes and means for causing either one or the other of said electrodes to become a cathode.

10. In an electric machine, the combination of means for producing a rotary magnetic field, a winding mounted to be subject to induction by said rotary field, a commutator member provided with a plurality of bars, a plurality of mercury arc valves connecting said bars to said winding, each of said valves comprising an envelope, two mercury electrodes, and means for causing either one of said electrodes to become a cathode, brushes cooperating with said commutator member and rotating relatively thereto in accordance with the rotation of said rotary field, and means for inducing in the commutating portions of said winding an electromotive force tending to reverse the current flowing through the commutator bars which are about to leave their engagement with the trailing portion of said brushes.

11. In an electric apparatus, the combination of means for producing a rotary magnetic field, a winding mounted to be subject to induction by said rotary field, a commutating member provided with a plurality of bars, a plurality of mercury arc valves connecting said bars to said winding, each of said valves comprising an envelope, two mercury electrodes, and means for causing either one of said electrodes to become a cathode, and brush members cooperating with said commutator member and rotating relatively thereto in accordance with the rotation of said rotary field, said brush members being shifted from their neutral positions in such directions as to cause said rotary field to induce in the commutating portions of said winding an electromotive force in the direction of the currents flowing in said winding portions after the commutation is effected.

12. In a dynamo-electric machine, the combination of a rotary member, an exciting winding upon said rotary member, a stator member cooperating with said rotary member, a winding upon said stator member having electromotive forces induced by said rotary member, a commutator member for said stator winding, a plurality of mercury arc valves connecting said commutator member to said stator winding, each of said valves comprising an envelope, two mercury electrodes and means for causing either one of said electrodes to become a cathode.

13. The combination with a direct-current line, of a dynamo-electric machine for receiving energy from, or transferring energy to, the said line, said machine comprising means for producing a rotary magnetic field, a winding cooperating with said field, electrical conductors leading from said line to uniformly distributed points of said winding, mercury arc valves connected in series with said connecting means, each of said mercury arc valves comprising an evacuated envelope, at least two mercury electrodes and an auxiliary actuating electrode, and means for momentarily impressing a high, direct-current potential upon said auxiliary electrode for starting an arc having for a cathode the mercury electrode having the lowest potential with respect to auxiliary electrode.

14. In a dynamo-electric commutation circuit, a mercury arc device, having at least two mercury electrodes connected in series with said circuit, an additional starting electrode in said mercury arc device, means for producing an alternating potential-difference between said two mercury electrodes, a high-voltage ignition coil connected between a point of said closed circuit and said auxiliary electrode, and means for momentarily actuating said ignition coil.

15. In a dynamo-electric machine, the combination of means for producing a rotary magnetic field, a winding mounted to be subject to induction by said rotary field, a plurality of terminals upon said winding, commutator mechanism comprising a plurality of commutator bars, positive and negative current-collecting brushes cooperating with said commutator mechanism, said brushes and commutator mechanism being adapted to rotate relatively to each other in accordance with the rotation of said field, and rectifier means for connecting said winding terminals to the bars of said commutator mechanism in the directions corresponding to the polarities of the adjacent brushes, respectively, said rectifier means comprising space-current devices having electrodes which are capable of operating either as cathodes or as anodes according to the direction in which the discharge is started, and being incapable of self-starting at the voltage impressed thereon by said winding, the dynamo-electric machine being so arranged that a commutating electromotive force is induced in the winding portion between said two bars, tending to reverse the current-flow in the first bar after the second bar has come into contact with said brush, and means for automatically exciting each space-current device to start the same as its associated commutator bar comes into contact with one of the brushes and for automatically discontinuing the excitation before the current through the space-current device has been reduced to zero.

16. A direct-current dynamo-electric machine comprising a winding, a commutator cylinder associated therewith, a brush bearing on said commutator cylinder, and valve means interposed between each commutator bar and said winding for substantially stopping the current-flow around the local circuit comprising the coil undergoing commutation while the bar is under a brush.

17. A direct-current dynamo-electric machine comprising a winding, a commutator cylinder associated therewith, a brush bearing on said commutator cylinder, and valve means interposed between each commutator bar and said winding for substantially preventing a circulatory current from flowing around the coil undergoing commutation while the bar is under a brush.

In testimony whereof, I have hereunto subscribed my name this 27th day of December, 1923.

JOSEPH SLEPIAN.